Sept. 29, 1931. V. G. LEACH 1,825,274
DUST RECOVERY DEVICE
Filed Dec. 5, 1930
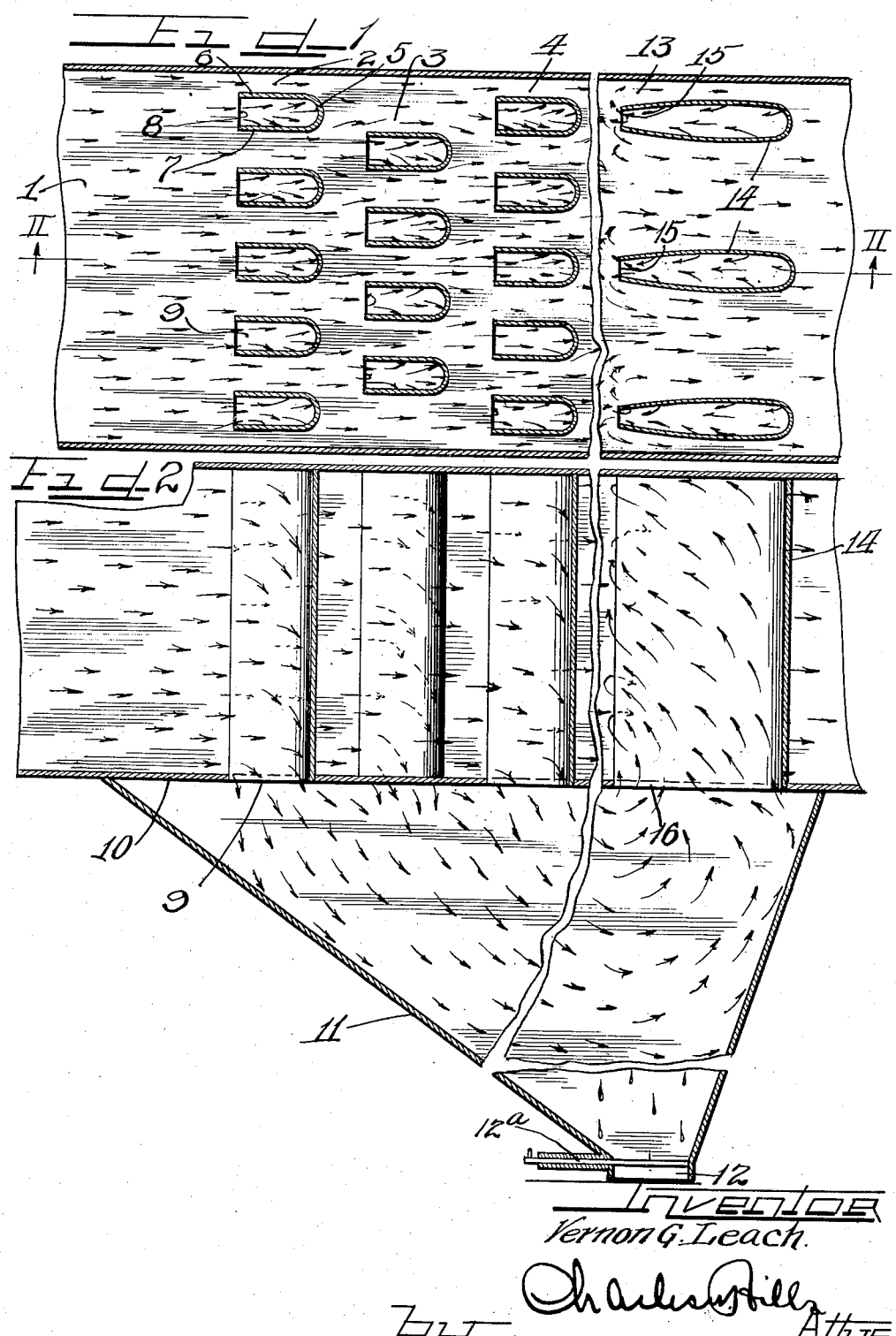
Inventor
Vernon G. Leach.

Patented Sept. 29, 1931

1,825,274

UNITED STATES PATENT OFFICE

VERNON G. LEACH, OF CHICAGO, ILLINOIS, ASSIGNOR TO MODERN COAL BURNER COMPANY, OF CHICAGO, ILLINOIS, A CORPORATION OF ILLINOIS

DUST RECOVERY DEVICE

Application filed December 5, 1930. Serial No. 500,197.

My invention relates to a device for separating solid particles from gases, and more particularly to a device for separating entrained dust, cinders and the like from flue gases.

Heretofore, such separators have been so constructed that the gases are passed through a tortuous passageway and the gases in changing their direction eliminate any heavier particles carried thereby, which may then drop into a receptacle located underneath the passageway and into which the passageway opens.

Such eliminators are objectionable in that, although there is a slight change in direction of the gases there is no such change as will cause substantially all the particles to leave the gaseous fluid. Further, there is a great tendency for the dust laden gases to hug the outside contours of the baffles and follow sinuous paths through the passageway, thereby passing through the eliminator without being acted upon.

It is an object of my invention to provide a dust separator which is simple in construction and positive in action.

It is a further object of my invention to provide a dust separator in which there are a number of baffles so arranged that substantially the entire flow of gases is subjected to changes in direction of at least 90° and in which the changes in direction of flow of a considerable volume of the gases are not only effected in a horizontal plane but also in a vertical plane.

It is a still further object of my invention to provide in a dust separator staggered baffles having plane parallel sides, whereby any tendency of the gases to hug the outer walls thereof and pass through without being acted upon by such separator is minimized.

These and other objects of my invention will be apparent from the following description and appended claims.

My invention (in a preferred form) is described in the following specification and in the drawings which form a part thereof.

On the drawings:

Figure 1 is a longitudinal cross section showing my separator located in a flue.

Figure 2 is a sectional view taken on the line II—II of Figure 1.

As shown on the drawings:

In the drawings the numeral 1 indicates a conduit or flue such as is used to connect a furnace with a smokestack. A number of rows 2, 3 and 4 of baffles 5 are located in the flue and extend from the top thereof to the bottom. Each row comprises a number of baffles 5 which are U-shaped and have vertical, plane side-walls 6 and 7. Openings 9 at the lower ends of the baffles 5 extend through the bottom 10 of the flue and give entrance to a hopper-shaped receptacle 11 into which the dust particles are diverted. The open front 8 of the baffles faces the incoming flow of gases. The baffles are spaced apart in each row and are so arranged that the baffles in one row face the spaces in the next preceding row. This staggered arrangement of the baffles causes substantially the whole volume of the gases to be diverted and thereby eliminates the contained dust particles.

The hopper-shaped receptacle 11 has an opening 12 in the bottom thereof normally closed by the slide 12a through which the accumulated particles may be discharged.

A row 13 of relatively larger elongated baffles 14 is located in the flue directly behind the row 4 of baffles 5. These baffles 14 provide elongated openings 15 in the flow of the gas which are narrower than the openings 8 in the other baffles. Openings 16 through the bottom of the flue and aligned with the baffles 14 serve for the re-entry into said flue of the gases which have been diverted along with the dust particles to the hopper 11. The baffles 14 are each located directly behind a baffle of the preceding row so as to eliminate any tendency of the gases to flow from the flue through the baffles 14 into the hopper 11.

The dust laden gases flow through the flue in the direction of the arrows. A considerable volume of such gases enters the baffles of row 2 and undergoes a change in direction, which drives the dust particles through the openings 9 into the hopper 11.

A certain fraction of the gases escaping the row 2 is similarly drawn into the baffles of row 3 and another fraction of the gases escaping these two rows is taken in by the succeeding row 4. A relatively large proportion of the dust particles is thus diverted and drops downwardly into the hopper 11, and collects in the bottom thereof, and may be removed through the opening 12 therein.

A considerable volume of the gases is carried into the hopper along with the dust particles. This volume of gases re-enters the flue through the baffles 14. In changing direction in the hopper and again in the baffles 14, these gases eliminate all particles which tend to become entrained therein. It will be seen that the gases undergo three stages of dust elimination. In the baffles of rows 2, 3 and 4, a large volume of gas is acted upon diverting a great amount of dust particles and a small amount of gas to the receptacle. In the latter this small amount of gas together with the relatively great amount of contained matter undergoes another change in direction whereby the particles drop by gravity to the bottom of the receptacle. The gas in leaving the receptacle goes through the elongated openings 15 and any particles which might still be entrained in the gas are dropped back into the receptacle.

It will thus be seen that my novel separator, as described, provides an advantageous and positive means of separting heavier particles from the gases passed through the flue 1. The arrangement of the baffles and proportioning of areas of the openings associated therewith are such that no subsantial resistance to the flow of flue gases is offered by the dust separator of my invention.

While I have described a preferred embodiment of my invention, I do not wish to be limited thereto, as I am aware that many changes may be made in the details of construction and arrangement of parts without departing from the spirit and scope of my invention.

I claim as my invention:

1. In a device of the class described, in combination a fluid conduit, a chamber located below said conduit, a series of U-shaped baffles having plane sides arranged in staggered relation in said conduit, said baffles extending from the top of the conduit to the bottom thereof, the bottom of said conduit being provided with openings aligned with said baffles for communication with said chamber and communicating means comprising another series of baffles having openings in the bottom thereof to allow the flow of the fluid from said chamber back into said conduit.

2. A recovery device for separating particles from a fluid, comprising a conduit having a series of openings in staggered arrangement in the bottom thereof, a hopper-shaped chamber located below said conduit, a series of baffles in said conduit for directing the fluid to said chamber through said openings, said baffles having plane vertical walls parallel to the direction of flow to diminish the tendency of the fluid to follow along the outer sides thereof, a second series of baffles located in said conduit beyond said first series and having communication with said chamber for providing a re-entry for the gases into said conduit.

3. In a device of the class described, in combination a fluid conduit, a chamber located below said conduit, a series of rows of U-shaped baffles in said conduit, said baffles being spaced apart in said rows, the baffles in each row being aligned with the spaces between the baffles in the next preceding row, said baffles having plane sides extending from the top of said conduit to the bottom thereof, the bottom of said conduit being provided with openings located in said baffles for communication with said chamber and communication means comprising another series of baffles having openings in the bottom thereof to direct the flow of the diverted fluid from said chamber to said conduit.

4. In a device of the class described, in combination a fluid conduit, a chamber located below said fluid conduit, a series of rows of U-shaped baffles having plane sides extending from the top of said conduit to the bottom thereof, said baffles being spaced apart in said rows, the baffles in each row having their sides aligned with sides of adjacent baffles in the next preceding row, the bottom of said conduit being provided with openings aligned with said baffles for communication with said chamber and communication means comprising another series of baffles having aligned openings in the bottom of said conduit to allow the return flow of any diverted fluid from said chamber to said conduit.

5. In a device of the class described, in combination a fluid conduit, a chamber located below said fluid conduit, a series of rows of U-shaped baffles having plane sides extending from the top of said conduit to the bottom thereof, said baffles being spaced apart in said rows, the baffles in each row having their sides aligned with sides of adjacent baffles in the next preceding row, the bottom of said conduit being provided with openings aligned with said baffles for communication with said chamber and baffles of larger size than the preceding baffles opening toward said preceding baffles and having aligned openings in the bottom of said conduit for allowing the return flow of any diverted fluid from said chamber to said conduit.

6. The method of separating solid particles from a gas, which comprises abruptly changing the direction of a horizontally flowing main stream of dust-laden gas to cause a portion thereof to be diverted downwardly to eliminate heavier solid particles, reversing the flow of the diverted portion of gas to an upward direction to effect further separation of solid particles and delivering the substantially dust free gas portion into the main stream against the flow thereof.

7. The method of separating solid particles from a flowing stream of gas, which comprises abruptly changing the direction of successive portions of said stream to divert downwardly a relatively small volume of gas containing a proportionately large volume of solid particles whereby a large proportion of the solid particles separate out by gravity, and again diverting said small volume of gas now containing only a relatively small volume of solid particles upwardly and out against the flow of the main stream of gas to effect further separation.

In testimony whereof I have hereunto subscribed my name at Chicago, Cook County, Illinois.

VERNON G. LEACH.